(12) United States Patent
Bowie

(10) Patent No.: US 8,267,124 B2
(45) Date of Patent: Sep. 18, 2012

(54) PIPELINE ISOLATION

(75) Inventor: Angus George Bowie, Aberdeen (GB)

(73) Assignee: STATS (UK) Limited, Aberdeen (GB)

( * ) Notice: Subject to any disclaimer, the term of this patent is extended or adjusted under 35 U.S.C. 154(b) by 0 days.

(21) Appl. No.: 12/813,779

(22) Filed: Jun. 11, 2010

(65) Prior Publication Data
US 2010/0313985 A1 Dec. 16, 2010

(30) Foreign Application Priority Data
Jun. 12, 2009 (GB) .................................. 0910144.5

(51) Int. Cl.
*F16L 55/16* (2006.01)
(52) U.S. Cl. ............... 138/98; 138/93; 138/90; 405/170
(58) Field of Classification Search ................. 138/89, 138/90, 93, 97; 405/170
See application file for complete search history.

(56) References Cited

U.S. PATENT DOCUMENTS

| | | | | |
|---|---|---|---|---|
| 4,332,277 A | * | 6/1982 | Adkins et al. ................ | 138/89 |
| 4,422,477 A | | 12/1983 | Wittman et al. ............... | 138/89 |
| 4,465,104 A | * | 8/1984 | Wittman et al. ............... | 138/89 |
| 4,991,651 A | * | 2/1991 | Campbell ...................... | 166/122 |
| 2007/0023096 A1 | * | 2/2007 | Buckley et al. ................ | 138/89 |
| 2007/0113622 A1 | | 5/2007 | Buckley et al. ................ | 73/49 |
| 2009/0272451 A1 | * | 11/2009 | Aleksandersen et al. ....... | 138/89 |
| 2010/0051130 A1 | * | 3/2010 | Syse et al. ..................... | 138/89 |

FOREIGN PATENT DOCUMENTS

| WO | 03/067134 A2 | 8/2003 |
|---|---|---|
| WO | 2005/059429 A1 | 6/2005 |

OTHER PUBLICATIONS

United Kingdom Search Report for Application No. GB0910144.5 dated Oct. 2, 2009.

* cited by examiner

*Primary Examiner* — Patrick F Brinson
(74) *Attorney, Agent, or Firm* — Carlson, Gaskey & Olds, P.C.

(57) ABSTRACT

A pipeline isolation plug for location in a section of pipe has two seal modules coupled together by a ball joint. The first module has a mandrel defining a pressure head which, in use, is exposed to the pipeline pressure. A seal element is mounted behind the pressure head and is radially extendable to engage a pipe inner wall. The second module has a mandrel defining a pressure head which, in use, is exposed to the fluid pressure between the first and second modules. Two axially spaced seal elements are mounted on the mandrel behind the pressure head and are radially extendable to engage the pipe inner wall.

22 Claims, 1 Drawing Sheet

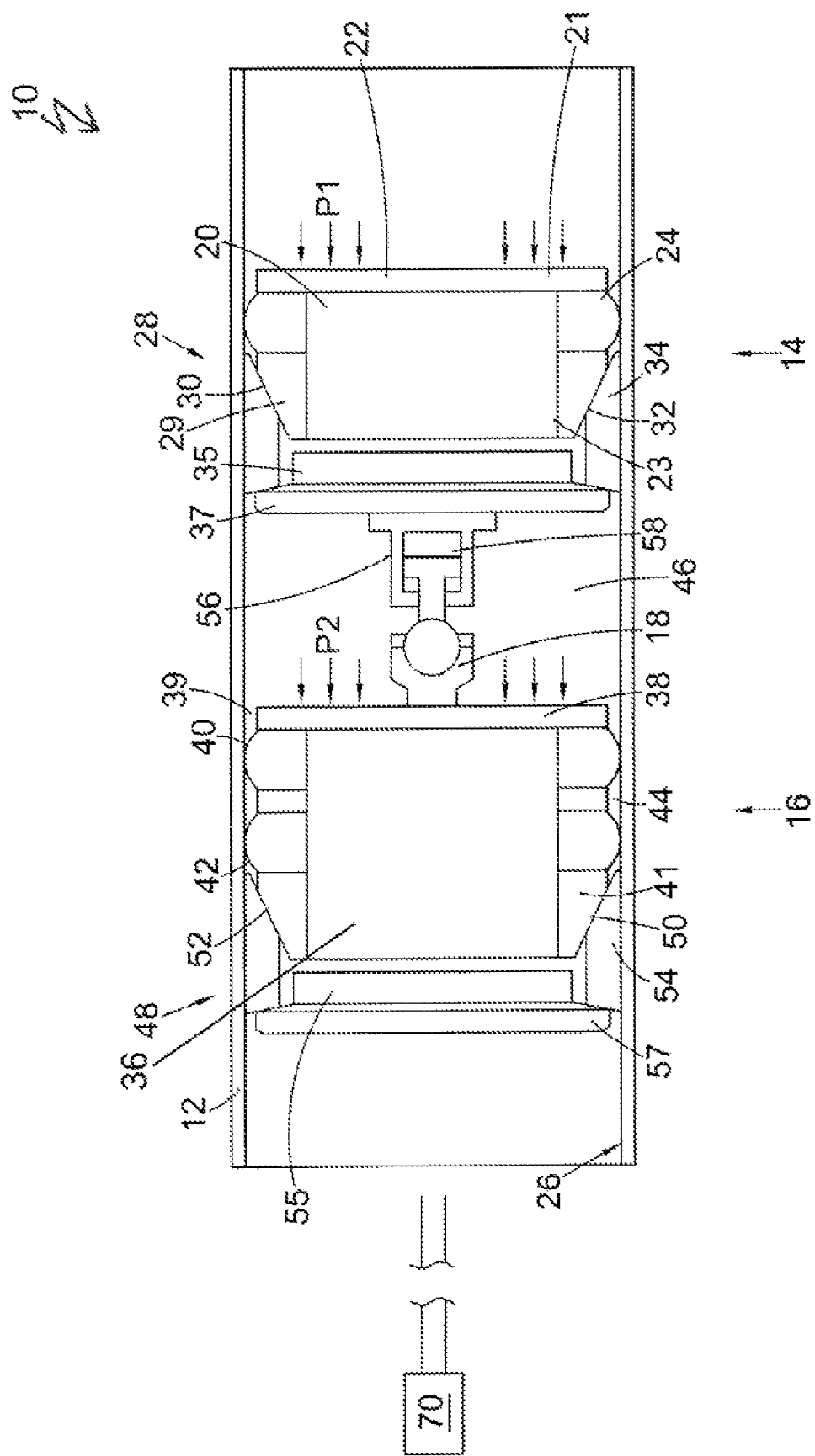

PIPELINE ISOLATION

REFERENCE TO RELATED APPLICATION

This application claims priority to United Kingdom Patent Application No. 0910144.5 filed Jun. 12, 2009.

FIELD OF THE INVENTION

This invention relates to pipeline isolation and, in particular, but not exclusively, to a tool for use in isolating a section of pipe used to transport fluid such as oil, gas or the like.

BACKGROUND OF THE INVENTION

Mechanical isolation tools, such as isolation plugs, have been used for many years in the pipeline industry to facilitate pipeline isolation, for example, where no valves have been provided in a given section of pipe.

These plugs are typically "piggable," that is, they can be transported into and through the pipeline using fluid pressure in the pipe and use a combination of taper locks to secure the plug within the pipe and either hydraulic set compression or inflation seals to engage the pipe wall to permit isolation of the pipe. Some plugs operate a fail-safe mechanism whereby the plug is configured so that differential fluid pressure acting across the plug maintains the seal and/or the lock in an energized configuration independently of the set pressure used to actuate the plug. Such plugs are described as being self energized.

A number of plug designs seek to provide double block and bleed isolation whereby two axially spaced seals engage the pipe wall, with the region between the seals being arranged to be vented or bled to facilitate testing or monitoring of the seals or pipe integrity. Generally, such plug designs fall within two categories.

In a first arrangement, two seals are provided with an annulus void between them and are retained by a single array of taper lock segments. This configuration has the advantage of providing a bleed facility while retaining fail safe energization on both seals.

In a second arrangement, a secondary array of locks is added between the seals and the plug is configured as two separate modules connected together by a bend compliant joint, each module containing a single seal and lock array. This configuration offers added redundancy in the addition of a second lock array, but has the limitation of requiring trapped pressure between the seals in order to provide fail-safe self energization of the secondary seal. This trapped pressure could be generated by high pressure hydrocarbons which are then isolated from the worksite by a single seal. Existing plug designs also have two lock and seal modules connected with couplings which provide only angular movement. As a result, only one lock array may be tested.

A number of variations have been made to the designs described above. For example, each of the seal and lock units may consist of separate modules for ease of assembly and transportation though the pipe.

SUMMARY OF THE INVENTION

According to a first aspect of the present invention, a pipeline isolation plug includes a first seal module including a first seal element and a first lock element. The first seal module is configured such that a fluid pressure differential across the module tends to actuate the first seal element. The pipeline isolation plug includes a second seal module coupled to the first module and includes second and third axially spaced seal elements and a second lock element. The second seal module is configured such that a fluid pressure differential across the module tends to actuate the second and third seal elements.

According to a second aspect of the present invention, a method of isolating a section of a pipe includes the steps of providing a plug having a first seal module including a first seal element and a first lock element and a second seal module including axially spaced second and third seal elements and a second lock element, the second seal module being coupled to the first seal module. The method further includes the steps of locating the plug in a pipe, actuating the rear one of the first and second modules to set the seal and lock elements, applying a pressure differential across the rear module to permit verification of the rear plug integrity, venting an annulus between the second and third seal elements of the rear plug module to ambient, actuating the front seal module to set the front seal and lock elements, and reducing the pressure between the modules to provide a pressure differential across the first module to further energize the first seal element while maintaining a pressure differential across the second module to further energize the second and third seal elements.

Embodiments of the present invention thus provide the benefits of a dual lock array configuration without the risks from a single seal isolation of the annulus pressure. Furthermore, embodiments of the invention provide an isolation tool which facilitates double block and bleed isolation of a section of pipe: the plug features three seal elements and a volume, typically an annulus, between the second and third seal elements which may be vented to ambient while maintaining self energization of the second and third seal elements. The actuation force or pressure applied to each seal element due to the pressure differentials acting across the modules may exceed the self energization actuation force required for the seal elements to maintain sealing engagement between the plug and the pipe wall in the event of the external actuation of the plug failing.

The first seal module may include a single seal element for engaging the pipe wall, and the second seal module may include two axially spaced seal elements for engaging the pipe wall.

In alternative embodiments, the first seal module may include a second seal element. The provision of a second seal element provides added contingency.

In particular embodiments, the first seal module may include a front module, that is, the upstream module or module likely to be exposed to higher pressure upstream of the plug, and the second seal module may include the rear module of the tool, that is, the downstream module or module likely to be exposed to lower pressure downstream of the plug.

Each seal module may include a mandrel defining, or providing mounting for, a pressure head, that is a surface or area against which an upstream fluid pressure acts. The first seal module may include a first pressure head, and the second seal module may include a second pressure head. One or both pressure heads may be configured to define an upstream cross sectional area only slightly smaller than the pipe cross sectional area, for example, the pressure head may have a diameter only slightly smaller than the pipe internal diameter.

The first pressure head, the set first seal element, and the first lock element may be arranged to block the pipe bore, whereby the upstream pipeline pressure acts on the first pressure head, allowing creation of a pressure differential across the first module to self energize the first seal element.

The second pressure head, the set front or upstream seal element of the second seal module and the second lock element may be arranged to block the pipe bore, whereby upstream fluid pressure acts on the second pressure head, allowing creation of a pressure differential across the second module to self energize both the second and third seal elements.

The axially spaced second and third seal elements of the second seal module may define a chamber or annulus there between and the pressure in the annulus may be controlled as required, for example, the annulus may be vented to permit monitoring of seal element or pipeline integrity.

The seal elements may be of any suitable form or construction. For example, at least one of the seal elements may include an elastomeric seal element, a compression seal or the like.

The lock elements may be of any suitable form and the lock element of the first seal module may include the same or a different lock arrangement to that of the second seal module. For example, one or more of the lock elements may include a taper lock and, in particular embodiments, the lock elements may include one or more lock member adapted to engage the pipe wall to secure the respective seal module in the pipe. The, or each, lock member may include an inclined surface arranged to engage with an inclined surface formed on, or mounted to, the mandrel of the seal module.

The locks may be configured to be self energized, that is a pressure differential acting across a module may tend to energize the respective module lock.

The tool may further include a coupling device for coupling the first and second seal modules. The coupling device may be of any suitable form and may, for example, include a ball joint, universal joint or the like.

The coupling device may be configured to permit a degree of relative movement between the seal modules, monitoring for axial movement between the first and second modules facilitating verification of the integrity of each or both of the lock elements. In particular embodiments, the coupling device may include a piston and cylinder arrangement, whereby monitoring the pressure in a piston chamber of the piston and cylinder arrangement indicates whether there has been relative movement between the seal modules, indicative of a lock failure. In an alternative arrangement, the coupling device may be configured to identify or monitor changes in the forces experience by the coupling device, for example, an increase in compression indicating potential failure of the first module lock, and an increase in tension indicating potential failure of the second module lock.

The tool may be deployed and operated by any suitable means. For example, the tool may be deployed by cable, stem bar or by pigging and may be operated by hydraulic tether, wireline, by remote control module, or the like. The tool may be configured to permit independent control of each seal module or alternatively, the modules may be controlled by a single system.

Each of the seal modules may be sub-divided into sub modules, for example, the first module may include a seal module and a lock module, and the second seal module may include two seal modules and a lock module. The arrangement of the seal elements may be selected to ensure the correct load path for self energization of all of the elements of the plug. This permits a high degree of flexibility, for example, for bend compliance and pigging operations. A modular construction may also facilitate modification or replacement of parts as required.

According to a further aspect of the present invention there is provided a pipeline isolation plug comprising a first seal module including a first seal element, the first seal module configured such that a fluid pressure differential across the module tends to actuate the first seal element and a second seal module coupled to the first module and including second and third axially spaced seal elements, the second seal module configured such that a fluid pressure differential across the module tends to actuate the second and third seal elements.

According to a still further aspect of the present invention, there is provided a method of isolating a section of a pipe. The method includes the steps of providing a plug having a first seal module including a first seal element and a second seal module including axially spaced second and third seal elements, the second seal module coupled to the first seal module. The method further includes the steps of locating the plug in a pipe, actuating the plug to set the seal elements, applying a pressure differential across the plug, and reducing the pressure between the modules to provide a pressure differential across the first module to further energize the first seal element while maintaining a pressure differential across the second module to further energize the second and third seal elements.

Aspects of the present invention also relate to apparatus and methods for providing pipeline isolation which permit verification of one or more lock used to secure the plug within the pipe.

Thus, according to a further aspect of the present invention, there is provided a pipe isolation plug including a first module having a seal element and a lock operable to engage the pipe wall, a second module having at least one seal element and a lock operable to engage the pipe wall, and a device coupling the first and second modules, the coupling device configured to permit monitoring of axial movement between the first and second modules.

According to a further aspect of the present invention, there is provided a method of isolating a section of pipe, the method including the steps of providing a plug comprising a first module having a seal element and a lock and a second module coupled to the first module and having at least one seal element and a lock, locating the plug in a pipe and setting the seal elements and locks to engage the pipe wall, and monitoring relative axial movement between the first and second modules.

It should be understood that the features defined above in accordance with any aspect of the present invention may be utilised, either alone or in combination with any other defined feature, in any other aspect of the invention.

BRIEF DESCRIPTION OF THE DRAWING

These and other aspects of the present invention will now be described, by way of example only, with reference to the accompanying drawing, which is a diagrammatic, part sectioned side view of an isolation tool in accordance with an embodiment of the present invention.

DETAILED DESCRIPTION OF THE DRAWING

FIG. 1 shows a diagrammatic side view of an isolation tool in the form of a plug 10 according to an embodiment of the present invention, the plug 10 shown located in a section of pipe 12. It will be understood that reference to the term pipe includes any tubular construction including an oil or gas pipeline, whether subsea, above or below ground, downhole tubing, or indeed any other tubular suitable for transporting or storing fluid.

The tool 10 has two seal modules 14, 16 coupled together by a ball joint 18. The joint 18 permits relative pitch, yaw and roll of the modules 14, 16 which facilitates insertion of the tool 10 into the pipe 12 and/or passage of the tool 10 through the pipe 12, for example around bends (not shown).

The first module 14 has a mandrel 20 defining a primary pressure head 22 which, in use, is exposed to the pipeline pressure P1. The mandrel 20 has a cylindrical body 23, and the pressure head 22 defines a diameter larger than the body 23.

An annular elastomeric seal element 24 is mounted on the mandrel 20 behind the pressure head 22, a front face of the seal element 24 abutting a shoulder 21 defined by a rear face of the pressure head 22.

A lock 28 is mounted on a rear portion of the mandrel 20 and includes a lock setting block 29 slidably mounted on the mandrel 20 and defining a tapered surface 30 adapted to engage corresponding tapered surfaces 32 on pipe wall engaging locking members 34. The block 29 defines a shoulder abutting a rear face of the seal element 24. The module 14 includes an internal actuating piston 35 that is axially movable relative to the mandrel 20 when the module 14 is supplied with pressurised hydraulic fluid through hydraulic lines from a remote fluid source. The piston 35 defines a shoulder 37 abutting a rear face of the locking members 34. In use, actuation of the module 14 by controlled supply of hydraulic fluid to retract the piston 35 into the mandrel 20 causes the pressure head shoulder 21 and the piston shoulder 37 to move towards one another, compressing and radially extending the seal element 24, and radially extending the locking members 34 to engage the pipe inner wall 26 to secure the module 14 within the pipe 12.

The second module 16 is similar to the first module in a number of respects, but carries two seal elements, as will be described. The module 16 has a mandrel 36 defining a secondary pressure head 38 which is exposed to the fluid pressure P2 in the chamber 46 between the first and second modules 14, 16. Two axially spaced elastomeric seal elements 40, 42 are mounted on the mandrel 36 behind the pressure head 38, a front face of the front seal element 40 abutting a shoulder 39 defined by a rear face of the pressure head 38. A rigid spacer disc is provided between the seal elements 40, 42.

A lock 48 is mounted on a rear portion of the mandrel 36 and comprises a lock setting block 41 slidably mounted on the mandrel 36 and defining a tapered surface 50 adapted to engage corresponding tapered surfaces 52 on pipe wall engaging locking members 54. The block 41 defines a shoulder abutting a rear face of the rear seal element 42. In a similar manner to the first module 14, the second module 16 includes an internal actuating piston 55 that is axially movable relative to the mandrel 36 when supplied with pressurized hydraulic fluid. The piston 55 defines a shoulder 57 abutting a rear face of the locking members 54. In use, actuation of the module 16 by controlled supply of hydraulic fluid to retract the piston 55 into the mandrel 36 causes the pressure head shoulder 39 and the piston shoulder 57 to move towards one another, compressing and radially extending the seal elements 40, 42, and radially extending the locking members 54 to engage the pipe inner wall 26 to secure the module 16 within the pipe 12.

An intermediate chamber 46 is defined in the pipe between the seal element 24 of the first module 14 and the front seal 40 of the second module 16. In use, after initially setting the tool 10, fluid in the chamber 46 (initially at pipeline pressure) is vented to provide a pressure differential across the first module 14. This generates a self-energization pressure differential across the first module 14 equal to the differential pressure multiplied by the area of the primary pressure head 22, and which further compresses and energizes the seal element 24. Thus, the seal element 24 acts as a primary self-activation seal. This self-energization force supplements the hydraulic set load from the internally mounted actuation piston cylinder arrangement.

The front seal 40 of the second module 16 acts as a secondary self-activation seal whereby the fluid pressure differential acting across the module 16 generates a force acting on the secondary pressure head 38 to maintain a self-energization pressure on both the front and rear seal elements 40, 42 of the second module 16, even if the chamber 44 between the seal elements 40, 42 is vented to atmospheric pressure.

The ball joint 18 couples the first and second modules 14, 16 and includes a piston and cylinder arrangement 56 which permits a degree of relative axial movement between the first and second modules 14, 16. By monitoring the hydraulic pressure in a piston chamber 58, the effectiveness of the locks 28, 48 can be verified. For example, if the front lock 28 were to fail or slip so that the first module 14 were to move towards the second module 16 under the influence of pipeline or test pressure, the volume of the chamber 58 would decrease, increasing the pressure in the chamber 58 or displacing fluid from the chamber 58. By monitoring the fluid pressure in the chamber 58, movement indicative of lock failure can be identified.

Similarly, if the rear lock 48 were to fail or slip so that the second module 16 were to move away from the first module 14, under the influence of the differential pressure acting across the module 16, the volume of the chamber 58 would increase, decreasing the pressure in the chamber 58 or drawing fluid into the chamber 58. Again, by monitoring the fluid pressure in the chamber 58, movement indicative of lock failure can be identified.

In the event of failure of the control system 70, in particular the loss of supply of hydraulic fluid to the energize the internal actuating piston/cylinder arrangements, the self-energising configuration of the modules 14, 16 will ensure that the tool 10 maintains a seal, at three axially spaced locations, and remains anchored in the pipe, at two axially spaced locations.

To permit controlled release of the tool 10 from the pipe in this situation, the operator first equalises the pressure across the second module 16. This may be achieved, for example, by raising pressure behind or downstream of the tool 10 to equal that in the chamber 46. The operator also vents pressure from the chamber 58 of the ball joint 18 to permit relative axial movement of the modules 14, 16. The second module mandrel 36 may now move upstream relative to the module piston 55, permitting release of the second lock 48 and de-activation of the seal elements 40, 42. Only the first module 14 is now anchoring the tool 10 in the pipe and providing a seal. To release the module 14 the operator raises the pressure in the pipe behind or downstream of the tool 10, to equalise pressure across the front module 14. The equalisation of pressure allows the mandrel 20 and piston 35 to move apart, releasing the lock 28 and de-activating the seal 24. The tool 10 thus has been passively unset, and may be recovered from the pipe 12.

Those of skill in the art will appreciate that the above described tool is merely exemplary of the present invention, and that various modifications and improvements may be made thereto without departing from the scope of the invention.

The invention claimed is:

1. A pipeline isolation plug comprising:
a first seal module comprising a first seal element and a first lock element, the first seal module configured such that a fluid pressure differential across the first seal module tends to actuate the first seal element; and
a second seal module coupled to the first seal module and comprising second and third axially spaced seal elements and a second lock element, the second seal module configured such that a fluid pressure differential across the second seal module tends to actuate the second and third seal elements.

2. The pipeline isolation plug of claim 1, wherein the plug is configurable to provide double block and bleed isolation of a section of pipe.

3. The pipeline isolation plug of claim 1, wherein a volume is defined between the axially spaced second and third seal elements, wherein the volume is ventable while maintaining self energization of the second and third seal elements.

4. The pipeline isolation plug of claim 1, wherein the actuation force applied to each seal element due to the pressure differential acting across the modules exceeds the self-energization actuation force required for the seal elements to maintain sealing engagement between the plug and a pipe wall.

5. The pipeline isolation plug of claim 1, wherein the first seal module comprises a second seal element for engaging a pipe wall.

6. The pipeline isolation plug of claim 1, wherein each seal module comprises a mandrel defining, or providing mounting for, a pressure head.

7. The pipeline isolation plug of claim 6, wherein the first pressure head, the set first seal element and the first lock element are arranged in the pipe so that the upstream pipeline pressure acts on the first pressure head, allowing creation of a pressure differential across the first module to self energize the first seal element.

8. The pipeline isolation plug of claim 6, wherein the second pressure head, the set upstream seal element of the second seal module and the second lock element are arranged in the pipe so that the upstream fluid pressure acts on the second pressure head, allowing creation of a pressure differential across the second module to self energize both the second and third seal elements.

9. The pipeline isolation plug of claim 1, wherein at least one of the lock elements is configurable to be self energized.

10. The pipeline isolation plug of claim 1, further comprising a coupling device for coupling the first and second seal modules.

11. The pipeline isolation plug of claim 10, wherein the coupling device is configurable to permit a degree of relative movement between the seal modules.

12. The pipeline isolation plug of claim 10, wherein the coupling device comprises a piston and cylinder arrangement.

13. The pipeline isolation plug of claim 10, wherein the coupling device is configured to identify changes in the forces experienced by the coupling device.

14. The pipeline isolation plug of claim 1, further comprising a deployment feature.

15. The pipeline isolation plug of claim 14, wherein the deployment feature comprises at least one of a cable, stem bar, wireline, hydraulic tether and pigging.

16. A method of isolating a section of a pipe, the method comprising the steps:
providing a plug having a first seal module comprising a first seal element and a first lock element and a second seal module comprising axially spaced second and third seal elements and a second lock element, the second seal module coupled to the first seal module;
locating the plug in a pipe;
actuating the rear one of the first and second modules to set the seal and lock elements;
applying a pressure differential across the rear module to permit verification of the rear plug integrity;
venting an annulus between the second and third seal elements of the rear plug module to ambient;
actuating the front seal module to set the front seal and lock elements; and
reducing the pressure between the modules to provide a pressure differential across the first module to further energize the first seal element while maintaining a pressure differential across the second module to further energize the second and third seal elements.

17. A pipeline isolation plug comprising:
a first seal module comprising a first seal element, the first seal module configured such that a fluid pressure differential across the module tends to actuate the first seal element; and
a second seal module coupled to the first module and comprising second and third axially spaced seal elements, the second seal module configured such that a fluid pressure differential across the module tends to actuate the second and third seal elements.

18. A method of isolating a section of a pipe, the method comprising the steps:
providing a plug having a first seal module comprising a first seal element and a second seal module comprising axially spaced second and third seal elements, the second seal module coupled to the first seal module;
locating the plug in a pipe;
actuating the plug to set the seal elements;
applying a pressure differential across the plug; and
reducing the pressure between the modules to provide a pressure differential across the first module to further energize the first seal element while maintaining a pressure differential across the second module to further energize the second and third seal elements.

19. A pipe isolation plug comprising:
a first module having a seal element and a lock operable to engage the pipe wall;
a second module having at least one seal element and a lock operable to engage the pipe wall; and
a device coupling the first and second modules, the coupling device configured to permit monitoring of axial movement between the first and second modules.

20. A method of isolating a section of pipe, the method comprising:
providing a plug comprising a first module having a seal element and a lock and a second module coupled to the first module and having at least one seal element and a lock;
locating the plug in a pipe and setting the seal elements and locks to engage the pipe wall;
monitoring relative axial movement between the first and second modules.

21. The pipeline isolation plug as recited in claim 1 wherein the axially spaced second seal element does not contact another seal element and the axially spaced third seal element does not contact another seal element.

22. The pipeline isolation plug as recited in claim 1 wherein at least one of the first seal element, the second seal element and the third seal element include a curved surface that contacts an inner surface of a pipe.

* * * * *

(12) EX PARTE REEXAMINATION CERTIFICATE (10703rd)
United States Patent
Bowie

(10) Number: US 8,267,124 C1
(45) Certificate Issued: Sep. 8, 2015

(54) PIPELINE ISOLATION

(75) Inventor: Angus George Bowie, Aberdeen (GB)

(73) Assignee: STATS (UK) LIMITED, Aberdeen (GB)

Reexamination Request:
No. 90/020,067, May 22, 2014

Reexamination Certificate for:
Patent No.: 8,267,124
Issued: Sep. 18, 2012
Appl. No.: 12/813,779
Filed: Jun. 11, 2010

(30) Foreign Application Priority Data

Jun. 12, 2009 (GB) .................................. 0910144.5

(51) Int. Cl.
*F16L 55/16* (2006.01)
*F16L 55/128* (2006.01)
*F16L 55/136* (2006.01)
*F16L 55/132* (2006.01)

(52) U.S. Cl.
CPC ........... *F16L 55/1283* (2013.01); *F16L 55/132* (2013.01); *F16L 55/136* (2013.01)

(58) Field of Classification Search
USPC ....................................... 138/89, 93; 166/122
See application file for complete search history.

(56) References Cited

To view the complete listing of prior art documents cited during the proceeding for Reexamination Control Number 90/020,067, please refer to the USPTO's public Patent Application Information Retrieval (PAIR) system under the Display References tab.

*Primary Examiner* — Jimmy G Foster

(57) ABSTRACT

A pipeline isolation plug for location in a section of pipe has two seal modules coupled together by a ball joint. The first module has a mandrel defining a pressure head which, in use, is exposed to the pipeline pressure. A seal element is mounted behind the pressure head and is radially extendable to engage a pipe inner wall. The second module has a mandrel defining a pressure head which, in use, is exposed to the fluid pressure between the first and second modules. Two axially spaced seal elements are mounted on the mandrel behind the pressure head and are radially extendable to engage the pipe inner wall.

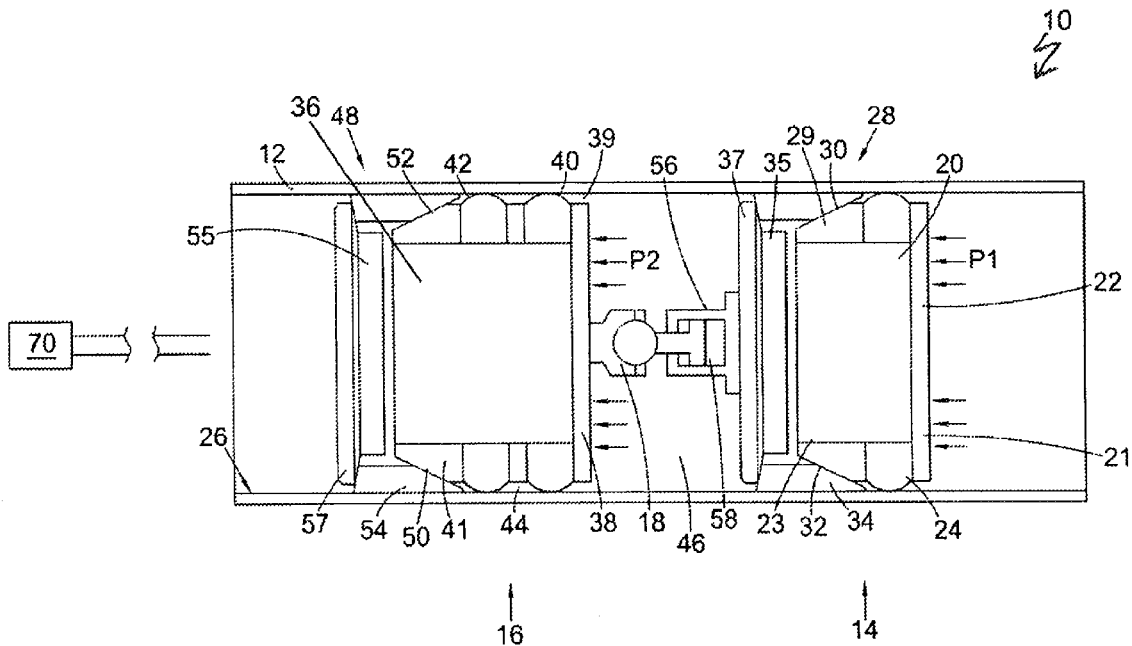

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 16 and 18-20 is confirmed.

Claims 1 and 17 are determined to be patentable as amended.

Claims 2-15, 21 and 22, dependent on an amended claim, are determined to be patentable.

1. A pipeline isolation plug comprising:
    a first seal module comprising a first seal element and a first lock element, the first seal module configured such that a fluid pressure differential across the first seal module tends to actuate the first seal element; and
    a second seal module coupled to the first seal module and comprising second and third axially spaced seal elements and a second lock element, the second seal module configured such that a fluid pressure differential across the second seal module tends to actuate the second and third seal elements, *wherein the pipeline isolation plug is configured so that, in use, reducing the fluid pressure between the modules provides a pressure differential across the first module to further energize the first seal element while maintaining a pressure differential across the second module to further energize the second and third seal elements.*

17. A pipeline isolation plug comprising:
    a first seal module comprising a first seal element, the first seal module configured such that a fluid pressure differential across the module tends to actuate the first seal element; and
    a second seal module coupled to the first module and comprising second and third axially spaced seal elements, the second seal module configured such that a fluid pressure differential across the module tends to actuate the second and third seal elements*; and*
    *wherein the pipeline isolation plug is configured so that, in use, reducing the fluid pressure between the modules provides a pressure differential across the first module to further energize the first seal element while maintaining a pressure differential across the second module to further energize the second and third seal elements.*

\* \* \* \* \*